United States Patent
Daub

(10) Patent No.: US 7,793,346 B1
(45) Date of Patent: Sep. 7, 2010

(54) SYSTEM, METHOD, AND COMPUTER PROGRAM PRODUCT FOR PREVENTING TROJAN COMMUNICATION

(75) Inventor: Jonathan A. Daub, New York, NY (US)

(73) Assignee: McAfee, Inc., Santa Clara, CA (US)

( * ) Notice: Subject to any disclaimer, the term of this patent is extended or adjusted under 35 U.S.C. 154(b) by 1520 days.

(21) Appl. No.: 10/346,969

(22) Filed: Jan. 17, 2003

(51) Int. Cl.
*G06F 11/28* (2006.01)
*G06F 11/34* (2006.01)
*G06F 12/14* (2006.01)
*G06F 11/00* (2006.01)
*G08B 23/00* (2006.01)

(52) U.S. Cl. .......... 726/22; 713/180; 713/176; 713/164; 713/167

(58) Field of Classification Search .......... 726/22; 713/180, 176, 164, 167
See application file for complete search history.

(56) References Cited

U.S. PATENT DOCUMENTS

| | | | |
|---|---|---|---|
| 5,257,381 A * | 10/1993 | Cook | 719/318 |
| 5,406,627 A * | 4/1995 | Thompson et al. | 380/237 |
| 5,440,723 A * | 8/1995 | Arnold et al. | 714/2 |
| 5,502,815 A * | 3/1996 | Cozza | 714/38 |
| 5,699,507 A * | 12/1997 | Goodnow et al. | 714/38 |
| 5,845,281 A * | 12/1998 | Benson et al. | 707/9 |
| 5,928,369 A * | 7/1999 | Keyser et al. | 714/47 |
| 6,026,362 A * | 2/2000 | Kim et al. | 705/1 |
| 6,115,680 A * | 9/2000 | Coffee et al. | 702/187 |
| 6,170,019 B1 * | 1/2001 | Dresel et al. | 719/330 |
| 6,249,571 B1 * | 6/2001 | Rojas | 379/112.01 |
| 6,574,763 B1 * | 6/2003 | Bertin et al. | 714/738 |
| 7,013,483 B2 * | 3/2006 | Cohen et al. | 726/25 |
| 7,093,239 B1 * | 8/2006 | van der Made | 717/135 |
| 7,140,005 B2 * | 11/2006 | Maliszewski | 717/126 |
| 7,251,735 B2 * | 7/2007 | Howard | 713/189 |
| 7,272,815 B1 * | 9/2007 | Eldridge et al. | 717/101 |
| 7,284,274 B1 * | 10/2007 | Walls et al. | 726/25 |
| 2001/0016042 A1 * | 8/2001 | Cofta et al. | 380/1 |
| 2003/0051026 A1 * | 3/2003 | Carter et al. | 709/224 |
| 2003/0177394 A1 * | 9/2003 | Dozortsev | 713/201 |
| 2003/0208569 A1 * | 11/2003 | O'Brien et al. | 709/221 |
| 2004/0098613 A1 * | 5/2004 | Schiavoni et al. | 713/200 |

(Continued)

FOREIGN PATENT DOCUMENTS

WO 01/80480 A1 10/2001

(Continued)

OTHER PUBLICATIONS

Security for "Always-On" Internet Connections. ZoneAlarm White Paper. Nov. 28, 1999. http://web.archive.org/web/19991128174439/www2.zonelabs.com/pdf/WP_ZoneAlarm.pdf.*

(Continued)

*Primary Examiner*—Emmanuel L Moise
*Assistant Examiner*—Tamara Teslovich
(74) *Attorney, Agent, or Firm*—Zilka-Kotab, PC

(57) ABSTRACT

A system, method and computer program product are provided for preventing unauthorized program modules from communicating. Initially, at least one program module is identified utilizing a central processing unit call history. Thereafter, an authorization test is performed on the at least one program module for preventing unauthorized program modules from communicating.

28 Claims, 4 Drawing Sheets

U.S. PATENT DOCUMENTS

| | | | |
|---|---|---|---|
| 2004/0199763 A1* | 10/2004 | Freund | 713/154 |
| 2004/0255163 A1* | 12/2004 | Swimmer et al. | 713/201 |
| 2004/0268322 A1* | 12/2004 | Chow et al. | 717/136 |
| 2005/0120242 A1* | 6/2005 | Mayer et al. | 713/201 |
| 2005/0273861 A1* | 12/2005 | Chess et al. | 726/25 |
| 2007/0261124 A1* | 11/2007 | Centonze et al. | 726/27 |

FOREIGN PATENT DOCUMENTS

| | | |
|---|---|---|
| WO | 01/92981 A2 | 12/2001 |

OTHER PUBLICATIONS

PC-based Internet Traffic Monitoring. TrueVector Technology White Paper. Nov. 28, 1999. http://web.archive.org/web/19991128162302/www2.zonelabs.com/pdf/WP_TrueVector.pdf.*

ZoneLabs Zone Alarm Pro. ZDNet. PC Magazine. Mar. 31, 2001. http://web.archive.org/web/20010331100344/www.zdnet.com/pcmag/stories/pipreviews/0,9836,371562,00.html.*

* cited by examiner

SYSTEM, METHOD, AND COMPUTER PROGRAM PRODUCT FOR PREVENTING TROJAN COMMUNICATION

FIELD OF THE INVENTION

The present invention relates to trojan viruses, and more particularly to preventing trojan viruses from communicating.

BACKGROUND OF THE INVENTION

In the realm of firewalls, a Trojan DLL and similar counterparts are a kind of trojan that leverages an authorized application program in order to cloak its own communication efforts. An authorized application program is one that the user has authorized the computer firewall to allow to communicate. Similarly, an unauthorized or unknown application program is not allowed to communicate. By this design, traditional Trojan EXEs are therefore blocked from communicating unless a user authorizes them.

Unlike Trojan EXEs, however, a trojan in a DLL form can easily bypass a firewall by leveraging an already authorized application program in order to cause it to be loaded into the address space (execution context) of the authorized application program. Once loaded, the Trojan DLL can unfortunately communicate under the shield of the authorized application program.

A Trojan DLL can use a number of methods in order to cause it to be loaded by an authorized application program. Table 1 illustrates some of such methods.

TABLE 1

| | |
|---|---|
| 1. | The Trojan DLL can be copied over an existing DLL used by the application program. |
| 2. | The Trojan DLL can be registered as a loadable object in place of, or in addition to, the existing DLL(s) used by the application program. |
| 3. | The Trojan DLL can use Windows ® API functions causing it to be injected into the address space of the authorized application program. |
| 4. | The Trojan DLL can spoof an existing DLL used by the application program and/or run the authorized application program from a different location. |

It should be noted that there are additional ways by which a trojan can execute in the context of an authorized application program, without requiring a DLL.

Prior art firewalls have deployed several techniques to guard against such Trojan DLLs. For example, firewalls have been designed to limit the communication of authorized application programs to specific protocols and/or channels. Moreover, such firewalls have been configured to detect attempts to communicate using other protocols and/or channels. Unfortunately, the trojan can still communicate using the protocols and/or channels that are allowed. Moreover, limiting communication in the foregoing fashion requires considerable research into the protocols and/or channels used by the application program, which tend to change over time and based on how the application program is used.

Still yet, prior art firewalls have been designed to protect program modules belonging to the authorized application program from being overwritten by a trojan. For example, newer versions of Windows® include system file protection (SFP) which protects most required system components from alteration. Unfortunately, however, it can be difficult to identify program modules belonging to an application program, since program DLLs are typically loaded and unloaded based on what the user is doing and what other application programs are running. Moreover, most DLLs in use by an application program are not used for the purpose of communication. Many applications including Windows® itself include updating mechanisms that cause the firewall to detect and report modifications to a DLL, even though the modifications do not result in any unauthorized communication.

Further, previous firewalls are capable of identifying and signing or check summing the program modules belonging to an authorized application program, either at the time the application program is authorized, or at any time prior to a trojan gaining control. The firewall can then re-validate the program modules in the address space of the authorized application program whenever it communicates, ensuring that only known and valid program modules exist in the address space. Unfortunately, however, this technique still suffers from some of the drawbacks listed above.

Even still, prior art firewalls can restrict access to the Windows® registry to prevent trojans from modifying or creating new registrations. Some personal firewall systems implement a similar form of this protection. However, many application programs routinely modify and create registrations, and it requires considerable user intervention to decide what application programs to authorize. Also, this method only protects against case (2) above.

Also in the prior art are firewalls that can intercept the Windows® API functions used to inject a DLL into the address space of another process. Regrettably, intercepting Windows® API functions is nontrivial and discouraged. Moreover, many application programs routinely use these API functions for legitimate means.

Finally, firewalls of the prior art can require an authorized application program to be re-authorized if it is run from another location, to prevent it from being used to shield a Trojan DLL. Some firewalls even do this automatically. However, this method only protects against case (4) above.

Unfortunately, as mentioned hereinabove, the foregoing prior art concepts fail to adequately prevent unauthorized program modules from communicating. There is thus a need for an improved technique of preventing viruses such as trojans from proliferating via communicating unauthorized program modules.

DISCLOSURE OF THE INVENTION

A system, method and computer program product are provided for preventing unauthorized program modules from communicating. Initially, at least one program module is identified utilizing a central processing unit call history. Thereafter, an authorization test is performed on the at least one program module for preventing unauthorized program modules from communicating.

In one embodiment, the at least one program module may be further identified by intercepting a function. As an option, such function may include a socket function.

In another embodiment, it may be determined whether an application program associated with the at least one program module is authorized. If the application program is authorized in whole, the function may be passed. On the other hand, if the application program is unauthorized in whole, the application program may be terminated, or the function may be failed. Still yet, if the application program is authorized only in part, various other tests may be performed.

For example, it may be determined whether the at least one program module of the application program is authorized. As an option, a manual test may be used to determine whether the at least one program module is authorized. Still yet, a database may be used to determine whether the at least one program module is authorized. Even still, a signature and/or a checksum may be used to determine whether the at least one program module is authorized.

Optionally, the determination as to whether the at least one program module is authorized may be stored. As such, the stored determination may be used during subsequent determinations as to whether the at least one program module is authorized.

Thus, if all of the program modules are authorized, the function may be passed. To this end, any unauthorized program modules may be prevented from communicating to preclude a virus associated with the unauthorized program modules from communicating. It should be noted that the virus may be include a Trojan virus, a Trojan DLL virus, etc.

As still yet another option, the foregoing functionality may be carried out utilizing a firewall. Of course, any desired type of architecture may be employed.

DESCRIPTION OF THE PREFERRED EMBODIMENTS

Figure 1:
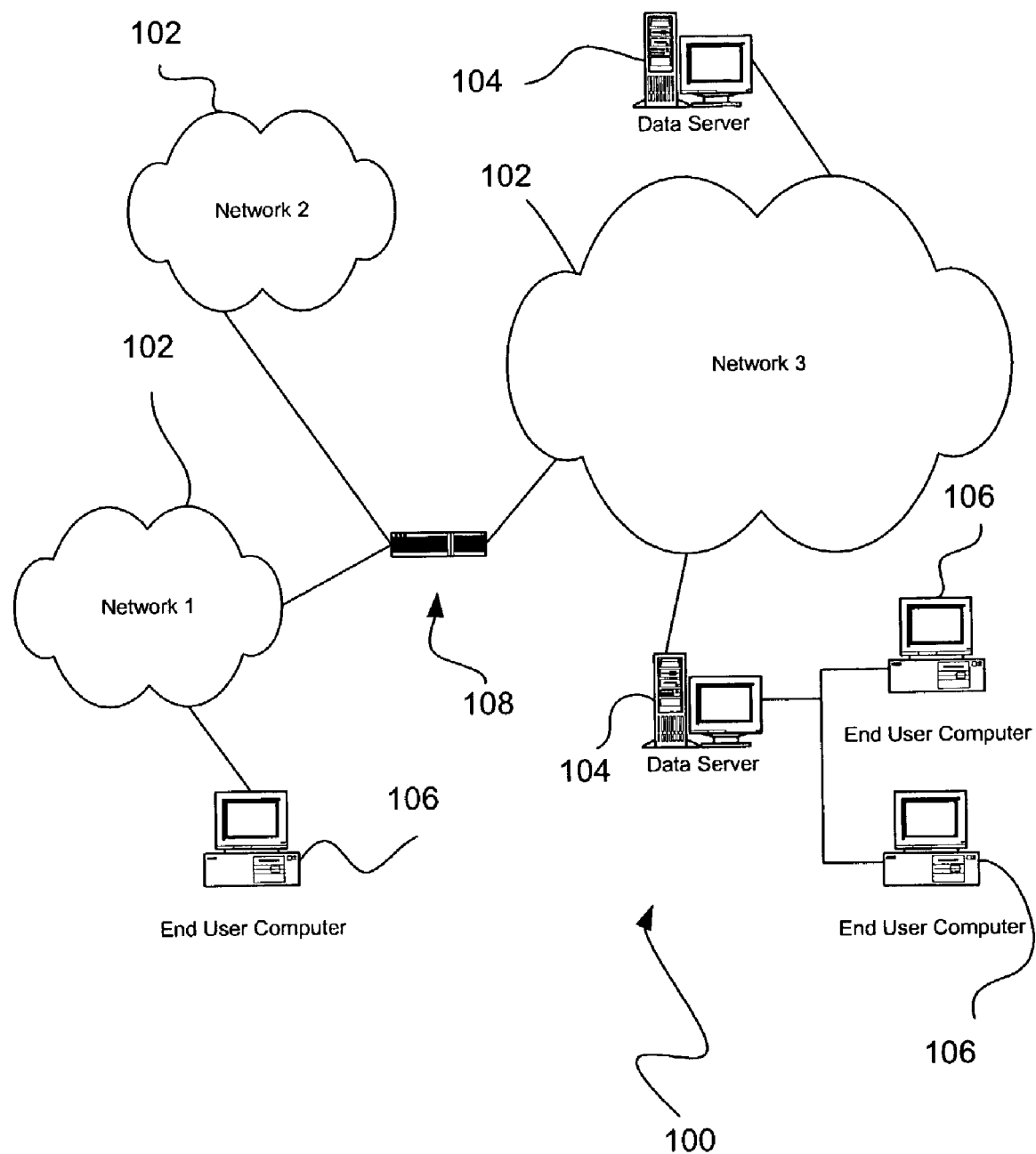
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106.

In order to secure communication among the networks 102, at least one firewall 108 is optionally coupled therebetween. While the firewall 108 is shown in one specific configuration, it should be understood that the firewall 108 may be implemented and configured in any desired manner. Just by way of example, the firewall 108 may include a personal firewall implemented on one or more of the data server computers 104 and/or end user computers 106. It should be further noted that each of the foregoing network devices as well as any other unillustrated devices may be interconnected by way of a plurality of network segments.

In one embodiment, the firewall 108 or any other component of the network architecture 100 may be capable of preventing unauthorized program modules from communicating. To accomplish this, at least one program module may be identified utilizing a central processing unit (CPU) call history. Thereafter, an authorization test may be performed on the at least one program module for preventing unauthorized program modules from communicating. More information regarding various optional features associated with such functionality will be set forth hereinafter in greater detail.

Figure 2:
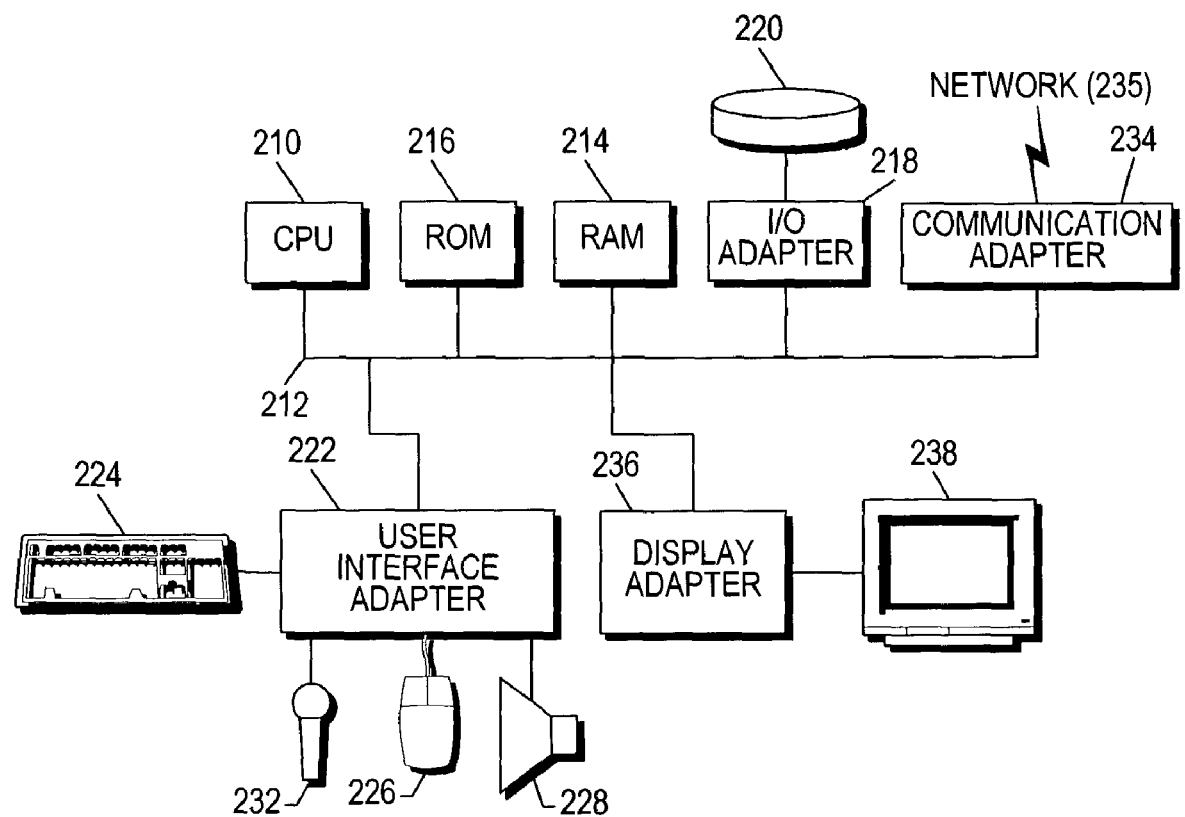
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
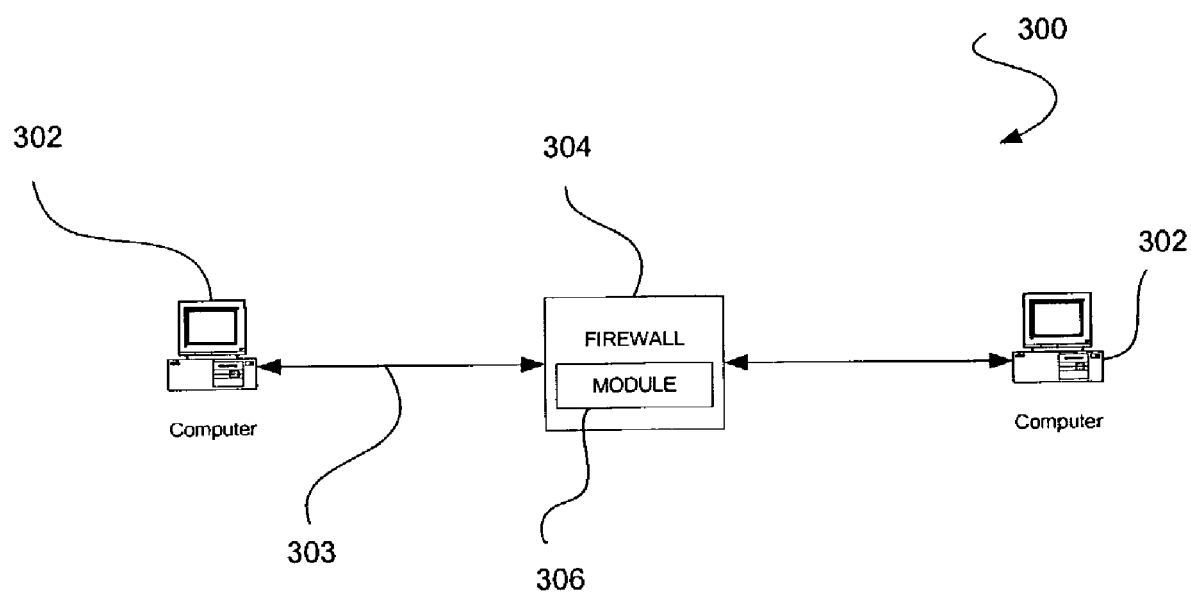
FIG. 3 illustrates one exemplary system with which unauthorized program modules may be prevented from communicating, in accordance with one embodiment.

FIG. 3 illustrates one exemplary system 300 with which unauthorized program modules may be prevented from communicating, in accordance with one embodiment. As an option, the present system 300 may be implemented in the context of the architecture of FIGS. 1 and 2. Of course, the present system 300 may be implemented in any desired context.

As shown, the present system 300 may include at least one two computers 302 communicating via a network segment 303. Coupled between the computers 302 is a firewall 304. In the context of the present description, the firewall 304 may include any hardware or software located at a network gateway server or elsewhere that protects the resources of a network of one or more computers 302 from activities of one or more computers 302 of another network.

In one embodiment, the firewall 304 may work in conjunction with a router program to examine each network packet and determine whether to forward it toward its destination. The firewall 304 may also include or work with a proxy server that makes network requests on behalf of computers 302. As an option, the firewall 304 may be installed in a specially designated computer separate from the rest of a network so that no incoming request can gain access directly to private network resources.

In addition to the foregoing functionality, the firewall 304 may further screen requests to make sure they come from acceptable (previously identified) domain name and Internet Protocol addresses. For mobile users, the firewall 304 may allow remote access into a network by using secure logon procedures and authentication certificates.

In one embodiment, a portion or module 306 of the firewall 304 may be equipped for preventing unauthorized program modules from communicating. Of course, such module 306 of the firewall 304 may include any desired software and/or hardware component. Moreover, as mentioned hereinabove, the module 306 need not necessarily be included as a component of the firewall 304 and, instead, may be incorporated in another computer or component of a network.

In use, the module 306 may be capable of preventing unauthorized program modules from communicating by identifying at least one program module utilizing a CPU call history. In the context of the present description, the at least one program module may include any component, portion, and/or segment of the computer code associated with a software application program. Moreover, the CPU call history may include a stack trace or any history of calls made by/to the CPU.

With the at least one program module identified, an authorization test may be performed for ensuring that the program module is authorized. Such authorization test may include any manual and/or automatic test capable of determining whether the program module is authorized for operation and/or continued operation. More information will now be set forth regarding optional features that may or may not be implemented in the context of the foregoing functionality.

Figure 4:
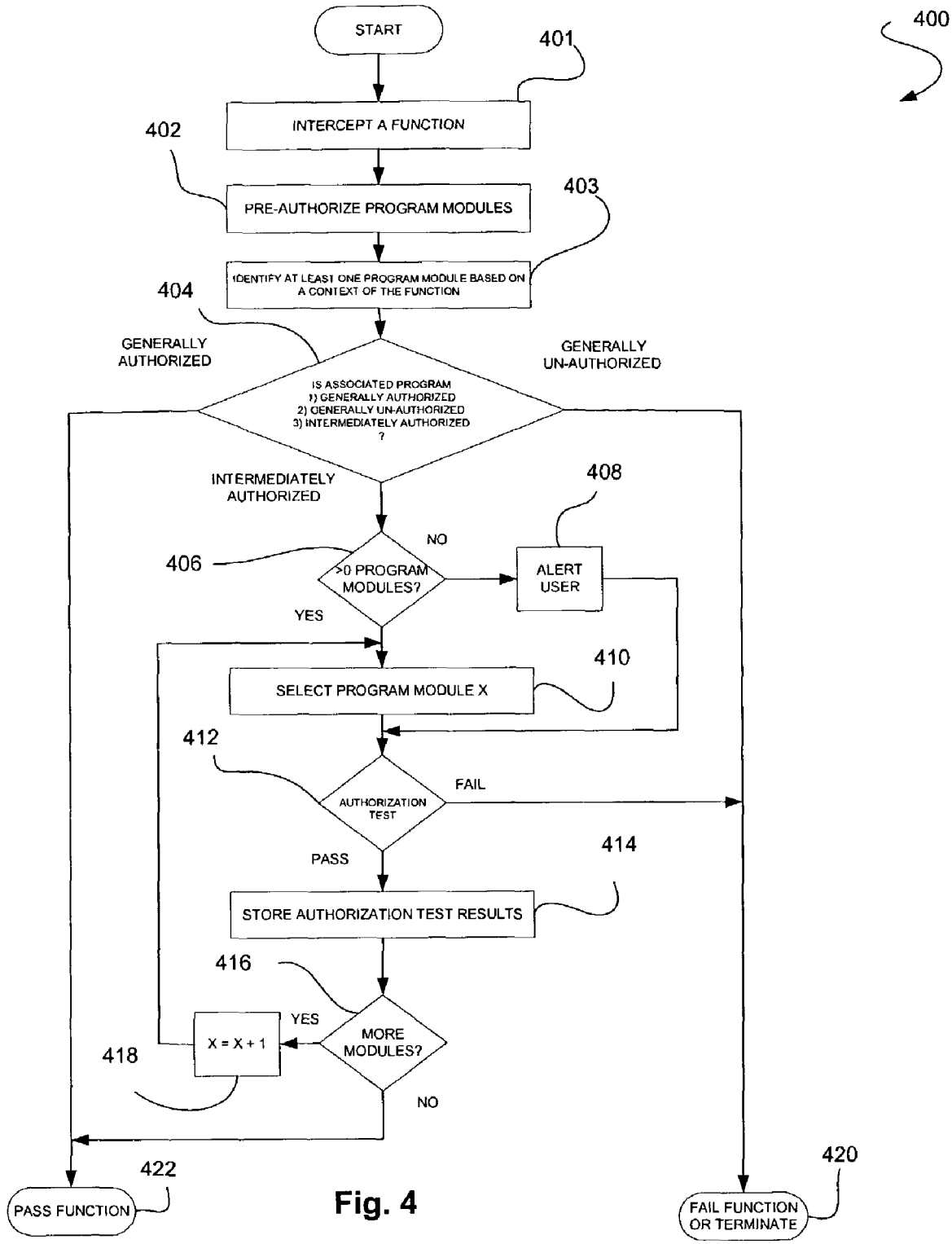
FIG. 4 illustrates a method for preventing unauthorized program modules from communicating, in accordance with one embodiment.

FIG. 4 illustrates a method 400 for preventing unauthorized program modules from communicating, in accordance with one embodiment. By preventing such unauthorized program modules from communicating, the present method 400 is capable of preventing Trojans possibly associated with such unauthorized program modules from communicating. As an option, the present method 400 may be carried out in the context of the system 300 of FIG. 3. Of course, the present method 400 may be carried out in any desired context.

Initially, in operation 401, at least one function is intercepted. In the context of the present description, such function may include any function associated with an application program. Just by way of example, such function may include a socket or transport function (i.e. a connect address function, a create socket function, a send data to address function, a receive data from address function, a listen for communication from any address function, etc.). Moreover, the function may be intercepted in any desired manner that is capable of identifying the function during communication, execution, etc. thereof.

For reasons that will be soon become apparent, the function is intercepted in a manner that recovers the CPU context thereof. This can be accomplished using well known techniques including the use of a layered service provider (LSP), transport driver interface (TDI), etc.

Once the function is intercepted, a pre-authorization procedure may be carried out in operation 402. Such pre-authorization procedure may be a manual or automatic process, whereby any program modules of the application program are pre-authorized or even pre-unauthorized for reasons that will soon become apparent.

Next, in operation 403, at least one program module associated with the application program is identified based on the CPU context of the function. In other words, using the aforementioned context, the at least one program module responsible for or associated with the intercepted function is identified in the current operation. As mentioned earlier, this may be accomplished utilizing a CPU call history (i.e. stack trace).

The foregoing technique may be supplemented in a variety of ways. For example, it may also be accomplished using a chain of exception frames such as is used by Structured Exception Handling, or by the CPU call history supplemented by the exception frame information, or supplemented by a brute force analysis of the CPU stack, registers, etc. In one embodiment, the stack trace may be configured to deal with any break down when arriving at a function that fails to set up the frame, by using the chain of exception frames to recover the stack trace and continue tracing.

Thus, it may then be determined whether the application program is authorized based on the stack context of the function. See decision 404. In making the present decision, three possible outcomes are possible, each referring to three distinct situations. Note Table 2.

TABLE 2

| | |
|---|---|
| 1. | All of the program modules of the application program are authorized (i.e. the application program is authorized "in whole", etc.) |
| 2. | All of the program modules of the application program are unauthorized (i.e. the application program is unauthorized "in whole", etc.) |
| 3. | Some of the program modules of the application program are authorized (i.e. the application program is authorized "in part", etc.) |

If the application program is generally authorized in whole (note situation #1 above), the function may be simply passed or, in other words, the one or more associated program modules are permitted to communicate. Note operation 422. To accomplish this, the function may be passed to where it would have gone initially, a call may be made to where the interception took place, etc. It should be noted that the foregoing general authorization may be effected by the user in operation 402, or at any other desired previous time.

If, on the other hand, the application program is generally unauthorized in whole (note situation #2 above), the application program may be terminated or, alternatively, the function associated with the one or more associated program modules may be failed. Note operation 420. As an option, an error code may even be returned. It should be noted that the foregoing general un-authorization may be effected by the user in operation 402, or at any other desired previous time. Moreover, un-authorization may extend to unknown application programs.

Still yet, if the application program is intermediately authorized in part (note situation #3 above), additional operations (note operations 406-418) may be carried out to deal with a situation where the program modules of the application program are not generally authorized or generally unauthorized, thus requiring a program module-by-program module authorization.

In particular, in decision 406, it is determined whether there is at least one (1) program module to be authorized. If, for some reason, no program modules exist, the user is optionally alerted of such situation in operation 408, and the function may be failed or the program terminated. Otherwise, method 400 proceeds with decision 412 that will be described hereinafter in greater detail. If, however, at least one program module is identified per decision 406, the first of such program modules is selected in operation 410.

An authorization test is then carried out in decision 412 with respect to the currently selected program module. As an option, a manual test may be used to determine whether the program module is authorized. For example, the currently selected program module may be identified (i.e. displayed, etc.), and the user may be given the option to authorize the same.

Of course, the decision 412 may be an automated process. By way of example, a database may be used to determine whether the at least one program module is authorized. In such case, an earlier-stored checksum or signature associated with the program module stored in the database may be compared with a presently calculated checksum or signature, respectively. If there is not a match, the application program may be terminated or, in other words, the function associated with the currently selected program module may be failed. Note operation 420.

If, however, the currently selected program module passes the authentication test in decision 412, the results of the authentication test may be stored in operation 414. In other words, the determination as to the fact that the current program module is authorized is stored.

As such, the stored determination may be used during subsequent determinations as to whether the program module is authorized. For example, the currently calculated checksum or signature associated with the program module may be stored in a database to that it may be used later during the authorization test of operation 412, if the program module is encountered again later.

The foregoing process is continued for each of the program modules of the application program. To accomplish this, it is determined in decision 416 as to whether more program modules exist. If so, the next program module is selected in operations 418 and 410, and the process continues accordingly until all of the program modules have been processed. If all of the program modules are authorized, the function may be passed, in accordance with operation 422.

Thus, if all of the program modules are authorized, the function may be passed. To this end, any unauthorized program modules may be prevented from communicating to preclude a virus (i.e. trojan virus, a Trojan DLL virus, etc.) associated with the unauthorized program modules from communicating.

The present method thus provides a heuristic that may be implemented with a firewall to detect and/or block Trojan DLLs from communicating using the context of an authorized application program. The heuristic may be adapted to quickly pinpoint Trojan DLLs while minimizing any false positives.

To accomplish this, the communication of functions of one or more application programs is intercepted. Upon a communication attempt being intercepted, it is determined if the application program is authorized, or unauthorized/unknown. If unauthorized/unknown, an attempt is made to authorize the application program (i.e. by requesting the user to authorize it, etc.).

The application program may thus be authorized by identifying the program module(s) associated with the application program and check summing and/or signing the program modules identified (i.e. authorizing each module individually). Program modules associated with the application program typically include those loaded into the address space of the application program during an initial run or for some additional period following authorization. Such program modules may also be known to be associated with the specific application program, and/or identified as responsible for some communication. It should be noted that system components, including those protected by system file protection (SFP), may or may not be associated with the application program, or can be identified and authorized (i.e. check summed, etc.) at a prior time (for example, at installation time).

Upon a communication attempt by an authorized application program being intercepted, the associated program module(s) responsible for the communication may be identified. The responsible program modules may be those appearing in the call history (i.e. stack trace) of the intercepted function. Reconstructing the call history may include analyzing, or "walking," the stack frame and/or the exception frame linkages, in addition to other methods, and associating each frame with a program module using well known techniques.

For each such responsible program module, it may then be determined whether the module is authorized, or unauthorized/unknown. If authorized, the function may be passed. If unauthorized or unknown, an attempt may be made to authorize the program module (e.g. by reporting it to the user with a request to authorize, etc.). It should be noted that once authorized, the program module may not necessarily need to be re-authorized during the program session.

If the user declines to authorize the program module, the communication can be rejected. Still yet, if the call history does not reflect any authorized program modules and/or reflects only modules that are known not to communicate, this can be reported to the user with a request to allow or disallow the communication. Or, the function can be failed or the program terminated.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for preventing unauthorized program modules from communicating, comprising:
    identifying at least one program module utilizing a central processing unit call history by intercepting a function, the central processing unit call history including a history of a plurality of calls in the form of a stack trace;
    performing an authorization test on the at least one program module for preventing unauthorized program modules from communicating; and
    determining whether an application program associated with the at least one program module is authorized based on a stack context of the function;
    wherein if the application program is authorized only in part:
        (a) it is determined whether one of the program modules of the application program is authorized,
        (b) results of (a) are stored,
        (c) if the program module fails to be authorized: at least one of the function is failed and the application program is terminated,
        (d) (a)-(c) are repeated for each of the program modules of the application program, and
        (e) the function is passed if all of the program modules are authorized;
    wherein a signature is used to determine whether the at least one program module is authorized;
    wherein the signature includes a calculated signature associated with the at least one program module, and the calculated signature is compared to an earlier-stored signature stored in a database and associated with the at least one program module.

2. The method as recited in claim 1, wherein the function includes a socket function.

3. The method as recited in claim 1, wherein if the application program is authorized in whole, the function is passed.

4. The method as recited in claim 1, wherein if the application program is unauthorized in whole, at least one of terminating the application program and failing the function.

5. The method as recited in claim 1, wherein a manual test is used to determine whether the at least one program module is authorized.

6. The method as recited in claim 1, wherein user intervention is used to determine whether the at least one program module is authorized.

7. The method as recited in claim 1, wherein the database is used to determine whether the at least one program module is authorized.

8. The method as recited in claim 7, wherein a checksum is used to determine whether the at least one program module is authorized.

9. The method as recited in claim 1, wherein the stored determination is used during subsequent determinations as to whether the at least one program module is authorized.

10. The method as recited in claim 1, wherein if at least one of the program modules is unauthorized, the function is failed.

11. The method as recited in claim 1, wherein if at least one of the program modules is unauthorized, the program is terminated.

12. The method as recited in claim 1, wherein the unauthorized program modules are prevented from communicating to prevent a virus associated with the unauthorized program modules from communicating.

13. The method as recited in claim 12, wherein the virus includes a Trojan virus.

14. The method as recited in claim 13, wherein the virus includes a Trojan DLL virus.

15. The method as recited in claim 1, wherein the identifying and the performing are carried out utilizing a firewall.

16. A system for preventing unauthorized program modules from communicating, comprising:
   memory for storing an application program and a central processing unit call history, the central processing unit call history including a history of a plurality of calls in the form of a stack trace; and
   a processor coupled to the memory, the processor capable of identifying at least one program module of the application program utilizing the central processing unit call history by intercepting a function, performing an authorization test on the at least one program module for preventing unauthorized program modules from communicating, and determining whether the application program associated with the at least one program module is authorized based on a stack context of the function;
   wherein the system is operable such that if the application program is authorized only in part:
      (a) it is determined whether one of the program modules of the application program is authorized,
      (b) results of (a) are stored,
      (c) if the program module fails to be authorized: at least one of the function is failed and the application program is terminated,
      (d) (a)-(c) are repeated for each of the program modules of the application program, and
      (e) the function is passed if all of the program modules are authorized;
   wherein a signature is used to determine whether the at least one program module is authorized;
   wherein the signature includes a calculated signature associated with the at least one program module, and the calculated signature is compared to an earlier-stored signature stored in a database and associated with the at least one program module.

17. A system for preventing unauthorized program modules from communicating, comprising:
   means for identifying at least one program module utilizing a central processing unit call history by intercepting a function, the central processing unit call history including a history of a plurality of calls in the form of a stack trace;
   means for performing an authorization test on the at least one program module for preventing unauthorized program modules from communicating; and
   means for determining whether an application program associated with the at least one program module is authorized based on a stack context of the function;
   wherein the system is operable such that if the application program is authorized only in part:
      (a) it is determined whether one of the program modules of the application program is authorized,
      (b) results of (a) are stored,
      (c) if the program module fails to be authorized: at least one of the function is failed and the application program is terminated,
      (d) (a)-(c) are repeated for each of the program modules of the application program, and
      (e) the function is passed if all of the program modules are authorized;
   wherein a signature is used to determine whether the at least one program module is authorized;
   wherein the signature includes a calculated signature associated with the at least one program module, and the calculated signature is compared to an earlier-stored signature stored in a database and associated with the at least one program module.

18. A computer program product stored on a non-transitory computer readable medium for preventing unauthorized program modules from communicating, comprising:
   computer code for identifying at least one program module utilizing a central processing unit call history by intercepting a function, the central processing unit call history including a history of a plurality of calls in the form of a stack trace;
   computer code for performing an authorization test on the at least one program module for preventing unauthorized program modules from communicating; and
   computer code for determining whether an application program associated with the at least one program module is authorized based on a stack context of the function;
   wherein the computer program product is operable such that if the application program is authorized only in part:
      (a) it is determined whether one of the program modules of the application program is authorized,
      (b) results of (a) are stored,
      (c) if the program module fails to be authorized: at least one of the function is failed and the application program is terminated,
      (d) (a)-(c) are repeated for each of the program modules of the application program, and
      (e) the function is passed if all of the program modules are authorized;
   wherein a signature is used to determine whether the at least one program module is authorized;
   wherein the signature includes a calculated signature associated with the at least one program module, and the calculated signature is compared to an earlier-stored signature stored in a database and associated with the at least one program module.

19. A method for preventing Trojan viruses from communicating, comprising:
intercepting at least one function;
identifying at least one program module of an application program associated with the at least one function utilizing a central processing unit call history by intercepting the at least one function, the central processing unit call history including a history of a plurality of calls in the form of a stack trace;
determining whether the at least one program module of the application program is authorized for preventing Trojan viruses from communicating based on a stack context of the function;
wherein if the application program is authorized only in part:
 (a) it is determined whether one of the program modules of the application program is authorized,
 (b) results of (a) are stored,
 (c) if the program module fails to be authorized: at least one of the function is failed and the application program is terminated,
 (d) (a)-(c) are repeated for each of the program modules of the application program, and
 (e) the function is passed if all of the program modules are authorized;
wherein a signature is used to determine whether the at least one program module is authorized;
wherein the signature includes a calculated signature associated with the at least one program module, and the calculated signature is compared to an earlier-stored signature stored in a database and associated with the at least one program module.

20. A method for preventing Trojan viruses from communicating, comprising:
intercepting at least one function;
identifying at least one program module of an application program associated with the at least one function utilizing a central processing unit call history by intercepting the at least one function, the central processing unit call history including a history of a plurality of calls in the form of a stack trace;
determining whether the application program is authorized based on a stack context of the function;
if the application program is authorized in whole: passing the function;
if the application program is unauthorized in whole: at least one of failing the function and terminating the application program; and
if the application program is authorized only in part:
 (a) determining whether one of the program modules of the application program is authorized,
 (b) storing results of (a),
 (c) if the program module fails to be authorized: at least one of failing the function and terminating the application program,
 (d) repeating (a)-(c) for each of the program modules of the application program, and
 (e) if all of the program modules are authorized: passing the function;
wherein a signature is used to determine whether the one of the program modules of the application program is authorized;
wherein the signature includes a calculated signature associated with the one of the program modules, and the calculated signature is compared to an earlier-stored signature stored in a database and associated with the one of the program modules.

21. The method as recited in claim 1, wherein the stack trace is configured to deal with a break down when arriving at a function that fails to set up a frame.

22. The method as recited in claim 1, wherein the identifying at least one program module utilizing the central processing unit call history is supplemented by exception frame information.

23. The method as recited in claim 1, wherein the identifying at least one program module utilizing the central processing unit call history is supplemented by a brute force analysis of a central processing unit stack.

24. The method as recited in claim 1, wherein the function includes a transport function, comprising one of a send data to address function and a receive data from address function.

25. The method as recited in claim 1, wherein intercepting the function recovers a central processing unit context of the function and the at least one program module is identified based on the recovered central processing unit context.

26. The method as recited in claim 1, wherein the call history is reconstructed by analyzing one or more stack frame linkages.

27. The method as recited in claim 1, wherein the calculated signature includes a checksum.

28. The method as recited in claim 1, wherein if the at least one program module is authorized, the calculated signature associated with the at least one program module is stored in the database and associated with the at least one program module.

* * * * *